US010726039B2

(12) United States Patent
Mathur (10) Patent No.: US 10,726,039 B2
(45) Date of Patent: Jul. 28, 2020

(54) SYSTEMS AND METHODS FOR UPDATING DATABASE INDEXES (71) Applicant: salesforce.com, inc., San Francisco, CA (US)

(72) Inventor: Rohitashva Mathur, Walnut Creek, CA (US)

(73) Assignee: SALESFORCE.COM, INC., San Francisco, CA (US)

(*) Notice: Subject to any disclaimer, the term of this patent is extended or adjusted under 35 U.S.C. 154(b) by 437 days.

(21) Appl. No.: 15/363,408

(22) Filed: Nov. 29, 2016

(65) Prior Publication Data
US 2018/0150533 A1 May 31, 2018

(51) Int. Cl.
G06F 7/00 (2006.01)
G06F 16/25 (2019.01)
G06F 16/22 (2019.01)
G06F 16/9535 (2019.01)
G06F 16/23 (2019.01)

(52) U.S. Cl.
CPC ........ *G06F 16/258* (2019.01); *G06F 16/2228* (2019.01); *G06F 16/23* (2019.01); *G06F 16/9535* (2019.01)

(58) Field of Classification Search
CPC ......... G06F 17/30569; G06F 17/30321; G06F 17/30867; G06F 16/9535; G06F 16/2228; G06F 16/258; G06F 16/23
USPC ................................ 707/756, 765, 769, 771
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 5,983,227 | A | 11/1999 | Nazem et al. |
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |

(Continued)

*Primary Examiner* — Md I Uddin
(74) *Attorney, Agent, or Firm* — Schwabe Williamson & Wyatt (57) ABSTRACT Systems, methods, and computer-readable media for obtaining database records during an index update process are described. A database system may identify indexes having a first data format to be converted into a second data format, and obtain a first query for retrieval of a set of records in a database. The first query may comprise a filter to be used for retrieval of the set of records. The database system may convert the filter into the first data format to obtain a first filter value, convert the filter into the second data format to obtain a second filter value, and generate a second query to include the first data format filter and the second data format filter. The database system may issue the second query to obtain the set of records. Other embodiments may be described and/or claimed.

19 Claims, 5 Drawing Sheets (56) References Cited

U.S. PATENT DOCUMENTS

| | | |
|---|---|---|
| 6,216,133 B1 | 4/2001 | Masthoff |
| 6,216,135 B1 | 4/2001 | Brodersen et al. |
| 6,233,617 B1 | 5/2001 | Rothweln et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Firodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatteriee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achaeoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Dice et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshaysky |
| 2011/0247051 A1 | 10/2011 | Bulumulla |
| 2012/0042218 A1 | 2/2012 | Cinarkaya |

(56) References Cited

U.S. PATENT DOCUMENTS

| | | | |
|---|---|---|---|
| 2012/0179703 A1* | 7/2012 | Ajitomi | G06F 16/24 |
| | | | 707/765 |
| 2012/0233137 A1 | 9/2012 | Jakobson et al. | |
| 2012/0290407 A1 | 11/2012 | Hubbard et al. | |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya | |
| 2014/0359537 A1 | 12/2014 | Jackobson et al. | |
| 2015/0310195 A1* | 10/2015 | Bailor | G06F 21/316 |
| | | | 726/6 |
| 2016/0217192 A1* | 7/2016 | Hota | G06F 16/219 |
| 2018/0137177 A1* | 5/2018 | Belcher | G16H 10/60 |

\* cited by examiner

SYSTEMS AND METHODS FOR UPDATING DATABASE INDEXES

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to systems and methods for updating database indexes, and in particular to systems and methods for updating database indexes during index conversion processes.

BACKGROUND

In multi-tenant database systems, customer organizations (also referred to as "tenants") may share database resources in one logical database. The databases themselves are typically shared, and each tenant is typically associated with an organization identifier (org ID) column or field that may be used to identify rows or records belonging to each tenant. Each tenant may provide their own custom data, which may include defining custom objects and custom fields, as well as designating one or more custom fields to act as custom index fields. The multi-tenant database system may store custom index data in a canonical data format in a custom index table with linkages to corresponding org IDs. The custom indexes may be canonicalized to keep the custom indexes in a standard or normalized format, for example, where custom indexed data values may have logically identical values but may not have an identical binary representation. When a user issues a database query with a filter, the filter may be converted to the canonical data format used by the custom index table prior to being issued against the custom index table.

In many scenarios, it may be desirable to update the canonical data format used for the custom index data in the custom index table. Such scenarios may include fixing bugs that cause issues when canonicalizing custom index data, which may result in data being hidden or un-retrievable from a tenant space; upgrading to a new unicode version; and/or adopting a more efficient or compact canonical data format that may reduce computational resources needed to canonicalize index data and/or allows for queries to be searched faster or more efficiently. Converting index data and/or custom index data into a new format may be a computationally intensive process. Depending on the size of the database system, such a conversion process may take many hours to several weeks to complete. In addition, since most conversion processes are very computationally intensive, such processes may result in slower database response times, etc. which may be caused by heavy database utilization during the index data format change process. In some cases, the conversion processes may require a database system to be shut down or taken offline in order to complete the index conversion process.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Embodiments discussed herein are directed to obtaining database records during index update processes. In embodiments, a database system may identify indexes having a first data format to be converted into a second data format, and obtain a first query for retrieval of a set of records in a database. The first query may comprise a filter to be used for retrieval of the set of records. In embodiments, the database system may convert the filter into the first data format to obtain a first filter value, and convert the filter into the second data format to obtain a second filter value. In embodiments, the database system may generate a second query to include the first data format filter and the second data format filter. In such embodiments, the second query may include the first data format filter and the second data format filter when the first filter value does not equal the second filter value. In embodiments, the database system may issue the second query to obtain the set of records, and generate a base table including individual records associated with indexes in the first data format and individual records associated with indexes in the second data format. Other embodiments are also described.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks" have not been described in detail in order to avoid unnecessarily obscuring of the disclosed implementations. Other implementations and applications are also possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

A database system might display a case associated with a customer support query. The database system may initiate a search for other cases related to the new case. The database system may extract relevant terms from the title and/or description provided in the new case using a term weighting algorithm, such as more like this (MLT). The relevant terms are then used in a search query for identifying the related cases.

The database system identifies articles linked to the related cases, ranks the articles, and causes the articles to be displayed on a remote user system in an order based on the ranking. The database system may rank the articles based on a number of related cases linked to the articles. The database system also may rank the article based on other parameters, such as relevancy scores for the related cases, labels assigned to the cases, last modified dates of the related cases, etc.

The database system may identify more relevant articles by first finding related cases that use a similar vocabulary to describe similar customer problems. The database system then identifies the articles that were previously determined to help resolve the prior problems. Thus, the database system may bridge the gap between vocabularies used by customers to describe problems and vocabularies used in articles to describe solutions to those problems.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

Figure 1A:
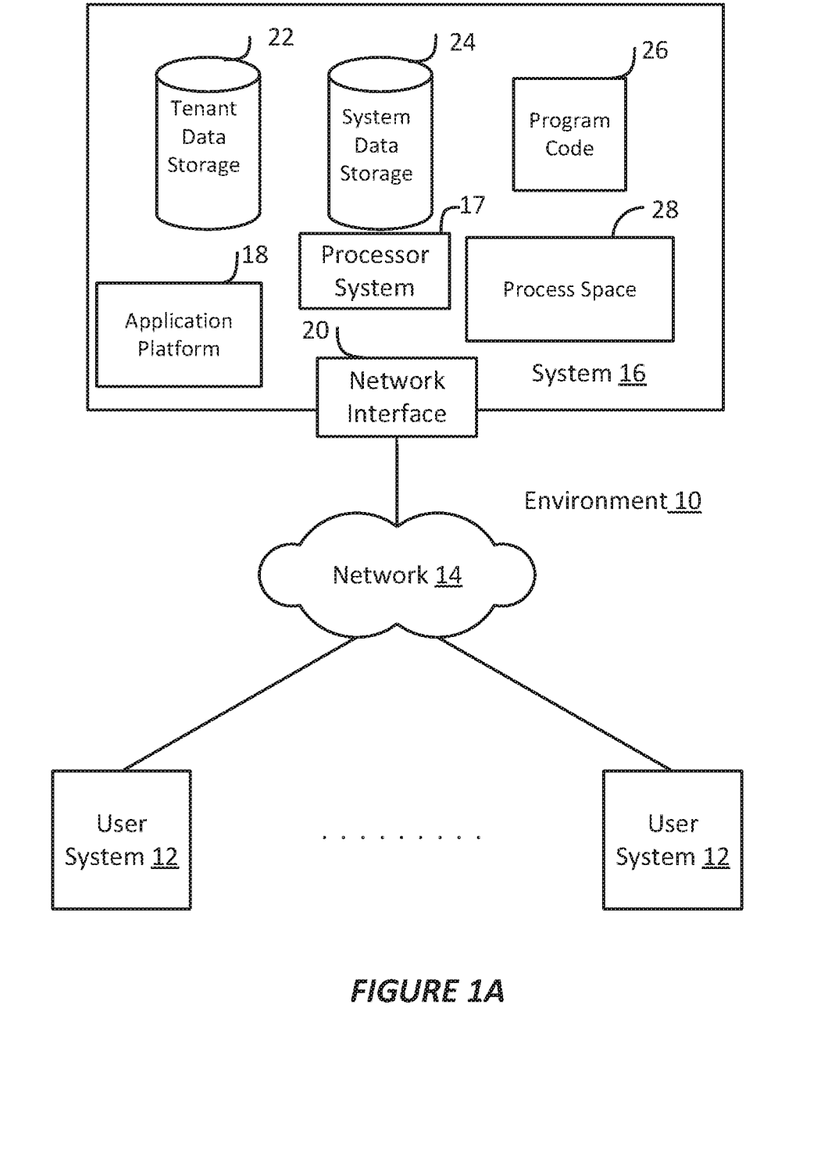
FIG. 1A shows a block diagram of an example environment in which an on-demand database service can be used according to some implementations.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
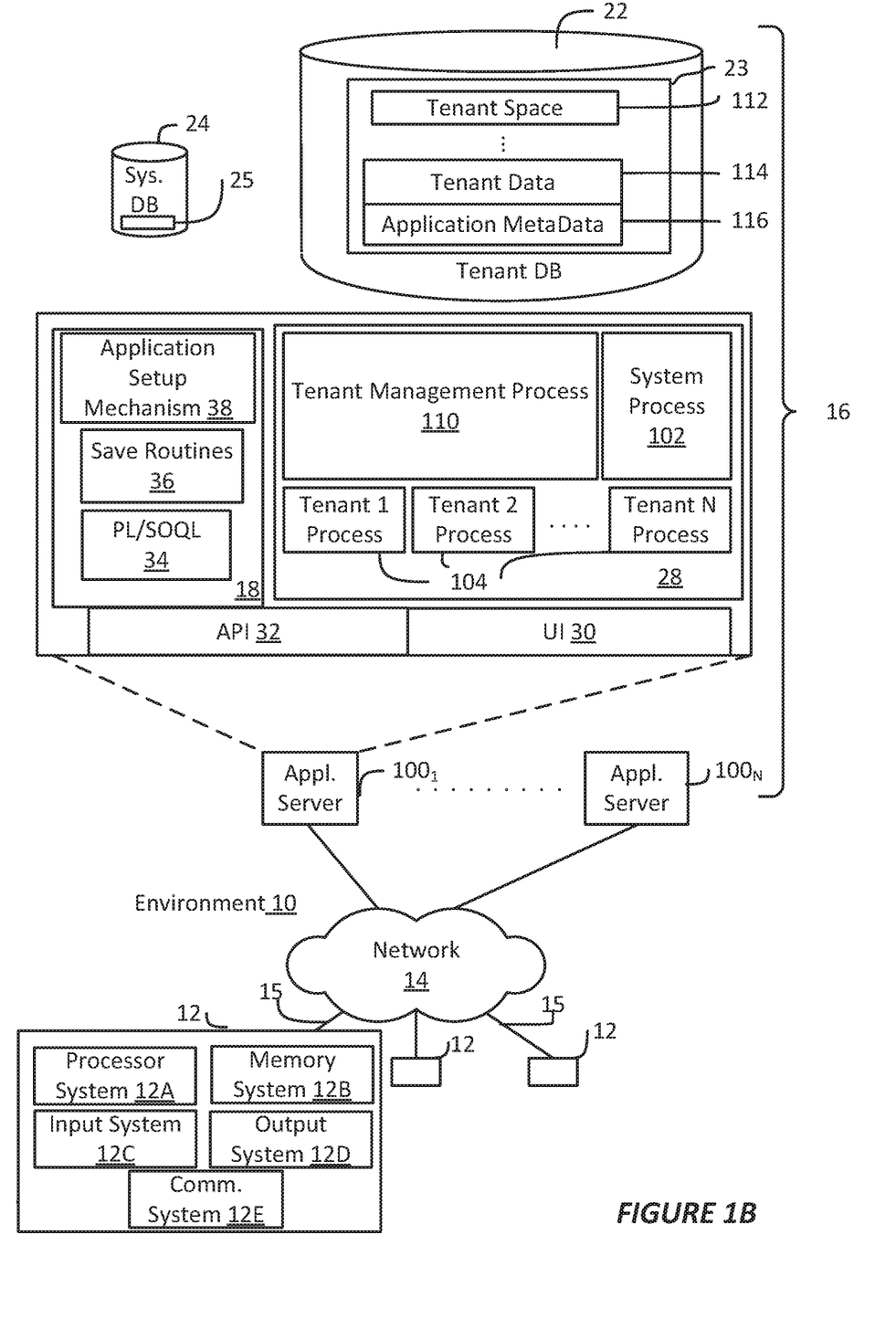
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, an output system 12D, and a communications system 12E. The processor system 12A can include any suitable combination of one or more processors, such as one or more central processing units (CPUs) including single-core or multi-core processors, one or more graphics processing units (GPUs), one or more field-programmable gate arrays (FPGAs), or any other electronic circuitry capable of executing program code and/or software modules to perform arithmetic, logical, and/or input/output operations. The memory system 12B can include any suitable combination of one or more memory devices, such as volatile storage devices (e.g., random access memory (RAM), dynamic RAM (DRAM), etc.) and non-volatile memory device (e.g., read only memory (ROM), flash memory, etc.). The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks. The communications system 12E may include circuitry for communicating with a wireless network or wired network. Communications system 12E may be used to establish a link 15 (also referred to as "channel 15," 'networking layer tunnel 15," and the like) through which the user system 12 may communicate with the database system 16. Communications system 12E may include one or more processors (e.g., baseband processors, etc.) that are dedicated to a particular wireless communication protocol (e.g., Wi-Fi and/or IEEE 802.11 protocols), a cellular communication protocol (e.g., Long Term Evolution (LTE) and the like), a wireless personal area network (WPAN) protocol (e.g., IEEE 802.15.4-802.15.5 protocols, Bluetooth or Bluetooth low energy (BLE), etc.), and/or a wired communication protocol (e.g., Ethernet, Fiber Distributed Data Interface (FDDI), Point-to-Point (PPP), etc.). The communications system 12E may also include hardware devices that enable communication with wireless/wired networks and/or other user systems 12 using modulated electromagnetic radiation through a solid or non-solid medium. Such hardware devices may include switches, filters, amplifiers, antenna elements, and the like to facilitate the communications over the air or through a wire by generating or otherwise producing radio waves to transmit data to one or more other devices, and converting received signals into usable information, such as digital data, which may be provided to one or more other components of user system 12. To communicate (e.g., transmit/receive) with the database system 16, the user system 12 using the communications system 12E may establish link 15 with network interface 20 of the database system 16.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI- TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2:
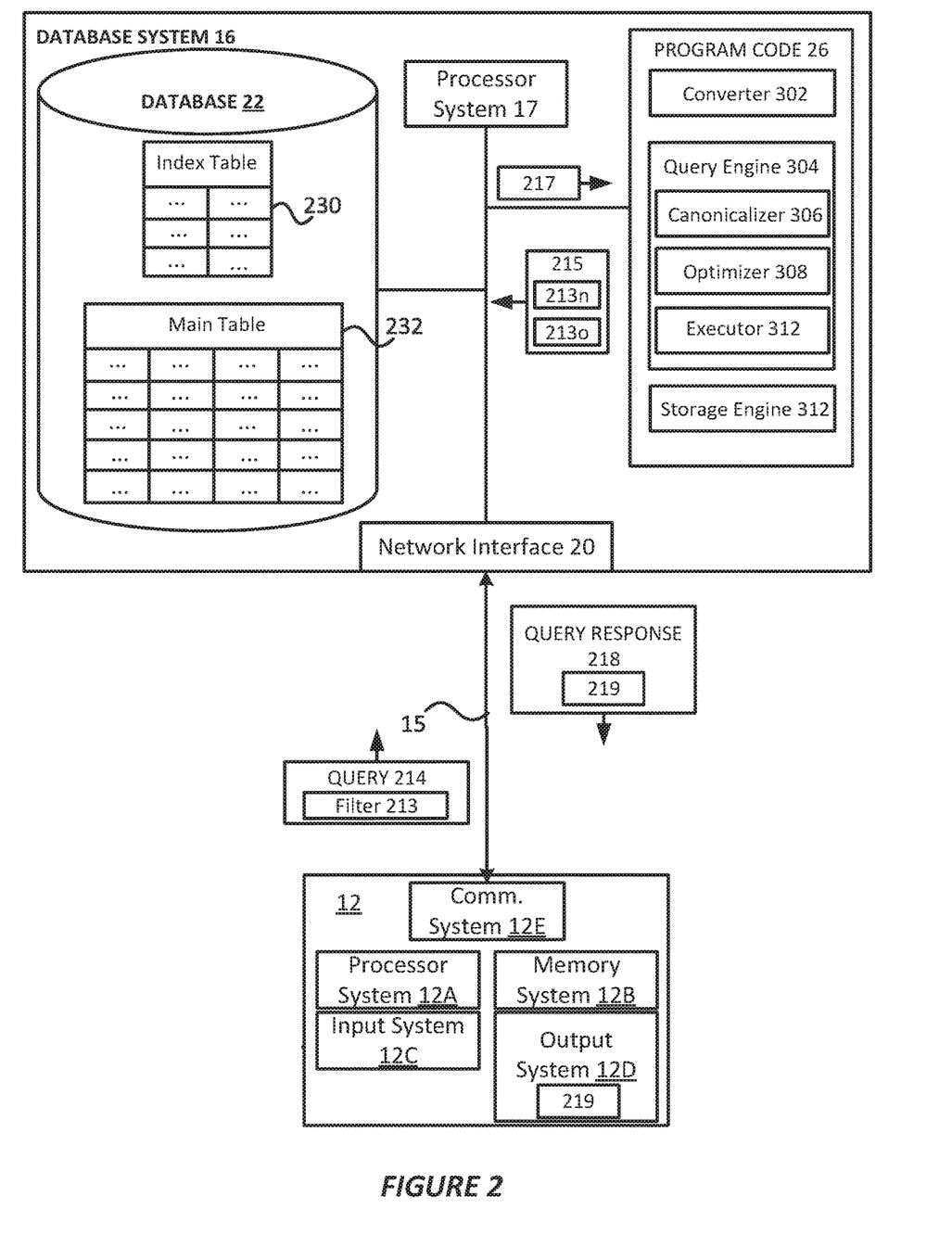
FIG. 2 shows an arrangement in which components of a user system interact with components of a database system in accordance with various embodiments.

FIG. 2 shows an arrangement 200 in which the components of a user system 12 interact with components of the database system 16, in accordance with various example embodiments. As shown, the user system 12 may include the processor system 12A, the memory system 12B, the input system 12C, the output system 12D, and the communications system 12E discussed previously with regard to FIGS. 1A and 1B. The database system 16 may include the processor system 17, the network interface 20, the database 22, and the program code 26 as discussed previously with regard to FIGS. 1A and 1B.

Referring to the user system 12, the memory system 12B may include an operating system (OS), one or more databases, and one or more applications (not shown). The processor system 12A may implement an application to generate and send query 214 (also referred to as a "user-issued query 214" and the like) to the database system 16. The query 214 may be a request for one or more data values, records, and/or fields stored in index table 230 and/or main table 232 of database 22. The query 214 may include one or more targets indicating tables or records to be searched, one or more conditions indicating properties of the records to be returned, one or more as filters 213 indicating elements of the records to be returned (e.g., particular data values or fields within a table), as well as one or more other options (e.g., sort parameters, maximum result size, and the like). The one or more applications that enable querying of the database 22 may utilize any suitable querying language to query and store information the database 22, such as structured query language (SQL), object query language (OQL), Salesforce® OQL (SOQL), Salesforce® object search language (SOSL), and/or other like query languages. Such an application may be designed to run on a specific platform, such as when the user system 12 is implementing in a mobile device, such as a smartphone, tablet computer, and the like. In some embodiments, the owner/operator of database system 16 may have pre-built the application for use by agents of an organization/tenant, and a user of the user system 12 may be an agent of the organization/tenant. Suitable implementations for the OS, databases, and applications, as well as the general functionality of the user system 12 are known or commercially available, and are readily implemented by persons having ordinary skill in the art, particularly in light of the disclosure herein.

Referring to the database system 16, program code 26 may include a converter 302, query engine 304, and storage engine 312, in addition to program code used for implementing the various functions of the database system 16. The query engine 304 may include a canonicalizer 306, a query optimizer 308 (also referred to as "optimizer 308", "query builder 308", "builder 308", and the like), and query executor 310 (also referred to as "executor 310" and the like). The program code 26, including program code of the converter 302, the query engine 304 (including the canonicalizer 306, optimizer 308, and executor 310), and storage engine 312 may be executed by the processor system 17. In response to execution of the program code 26, the database system 16 may implement or perform the various tasks, operations, procedures, processes, etc. of the example embodiments discussed herein. For example, execution of the program code 26 may cause the database system 16 to perform the processes 300 and 400 discussed with regard to FIGS. 3-4.

In embodiments, the converter 302 may convert indexes or custom indexes into new or different canonical data formats. In this regard, the processor system 17 implementing the converter 302 may identify a new canonical data format to be applied to indexes or custom indexes, identify a set of indexes or custom indexes in an old canonical data format to be converted into the new canonical data format, and convert each index of the set of indexes into the new canonical data format. In embodiments, converter 302 may obtain a conversion job that indicates the set of indexes or custom indexes to convert.

As an example, the processor system 17 may implement a canonicalization function $f$ for a conversion job b, which may be implemented as a batch job or as an in-time calculator (also referred to as "converter b", "converter batch job b", and the like). The converter batch job b may convert custom index data entries in a custom index table from an old canonical data format to new canonical data format by applying the canonicalization function $f$ to the identified indexes. Depending upon the definition of the canonicalization function, the conversion job b may or may not need to read the original text values from a base table 219 or the main table 232 against which the identified indexes have been built. The canonicalization function $f$ may be a function that converts any input value (e.g., a string, number, etc.) into a selected canonical form. In some cases, the values generated by canonicalization function $f$ may or may not be different than the original value or the value in the old canonical data format, which was calculated by the old canonicalization function.

Continuing with this example, the conversion job b may identify a set of custom indexes to convert, and identify $f\_new$ as a new canonical data format to be applied to the set of custom indexes which had been canonicalized earlier using function $f\_old$. In this case, the data may be stored in a custom index table in an old canonical data format determined by invoking $f\_old$ on the data value s to be canonicalized. The processor system 17 implementing canonicalization function $f$ may select one or more indexes in the set of custom indexes, and convert the one or more indexes from $f\_old$ to $f\_new$. The canonicalization function $f$ may convert the selected indexes in serial or in parallel depending on implementation details of the system. Once the conversion job b finishes conversion of a custom index to the new format $f\_new$, the canonicalization function $f$ may mark an index conversion marker i for that index to "complete" or "finished." The index conversion marker i may be a persistent marker (e.g., a database table entry) that is accessible to both the converter job b as well as the application (e.g., program code for the canonicalizer 306 implementation as used by the application code representing the query engine 304, which may include the optimizer 308 a query builder and generator, and/or the optimizer 308). The persistent marker may be represented as text (e.g., using the word "complete" or "incomplete"), one or more numbers (e.g., "0" for incomplete and "1" for complete), a flag indicating its state, and/or the like. The index conversion marker i may indicate whether or not a particular custom index for an organization has been fully converted to the new canonical data format or not.

In embodiments, the query engine 304 (also referred to as a "query processor 304", "relational engine 304", and the like) may be program code that obtains a query 214 (e.g., from user system 12 via the network interface 20), translates the query 214 into a native query statement (e.g., query 215), evaluates and executes the translated query 215, and returns results of the query 214 (e.g., query response 218) back to the issuing party (e.g., user system 12). To perform these functions, the query engine 304 may include the canonicalizer 306, the query optimizer 308, and the executor 310, as well as other components that are not shown by FIG. 2, such as a parser, SQL manager, database manager, and/or other like components.

The query optimizer 308 (also referred to as a "query builder", "query builder q", and the like) may be program code that may analyze a user-issued query submitted to the database system 16 (e.g., query 214), and determine how that query should be executed based on one or more selected query plans. The query plan(s) may indicate an order of operations used to access data in the database system 16. For example, the optimizer 308 may determine a join technique (e.g., merge join, hash join, etc.) and an index access path (e.g., primary index access, secondary index access, etc.), and join in the other table(s), which were not explicitly specified in the original query 214, such as the custom index data table 230. The optimizer 308 may translate the query 214 into an executable form (e.g., query 215) using the selected query plan(s) for execution by the executor 312. In embodiments, the optimizer 308 may also use inputs provided by the canonicalizer 306 when generating the query 215. The query 215 may be referred to as an "index data state query 215" or an "unknown index data state query 215" since the query 215 is used to obtain records associated with index data in an unknown state (e.g., in an old or new canonical data format).

The canonicalizer 306 may be program code that converts input text or values into a desired canonical form. In embodiments, the canonicalizer 306 may convert one or more values included with the filter 213. For example, the filter 213 may include an original filter value v. While the conversion process is taking place (e.g., conversion job b), the canonicalizer 306 may convert the filter 213 into the old canonical data format (e.g., $f\_old$) to obtain an old filter value $f\_old(v)$. In addition, the canonicalizer 306 may convert the filter 213 into the new canonical data format (e.g., $f\_new$) to obtain a new filter value $f\_new(v)$. In embodiments, the canonicalizer 306 may provide the old filter value $f\_old(v)$ and the new filter value $f\_new(v)$ to the query optimizer 308. Using the old filter value $f\_old(v)$ and the new filter value $f\_new(v)$, the query optimizer 308 may generate the query 215 to include two query components, $f\_old\_query$ 213o and $f\_new\_query$ 213n.

Continuing with the previous example, for the query 214 to be applied against a custom index table using the value v during the conversion job b, the query builder q may look at an index conversion marker i for a particular index to determine if that particular index has been converted to the new format $f\_new$ or not. If the conversion marker i is marked as complete, the query builder q may evaluate the query 214 and generate a native query (e.g., query 215) by substituting each filter value against the custom index table 230 with $f\_new(v)$, the new canonical data format, according to typical procedures.

If the conversion marker i is not marked as complete, the query builder q may evaluate both $f\_old(v)$ and $f\_new(v)$ for each value of v that is queried against the custom index table. In embodiments, when $f\_old(v)$ and $f\_new(v)$ are different (e.g., not equal), the query builder q may generate a query 215 comprising the two components $f\_old\_query$ 213o and $f\_new\_query$ 213n, which may include $f\_old(v)$ and $f\_new(v)$, respectively, for each value of v.

When the definition of the old and new canonicalization functions is such that $f\_new(x) != f\_old(x)$, where x is the filter value 213 and $f\_new(a) != f\_old(b)$ where $a != b$, and where a and b are any one of the values that the custom indexed data can assume, then the query builder q may generate the query 215 according to various first embodiments. The first embodiments may include function definitions that are the same or similar to the functions described infra. Using the functions of the first embodiments, the query builder q can generate queries 215 that are more efficient than conventional queries, which may be written against the custom index table 230 and may not require an explicit de-duplication of rows. For each of the query expression types of the first embodiments, the new query 215 can be generated as follows.

In various first embodiments, if the original filter 213 can be transformed into an equality expression, the query builder q may generate an inlist expression that holds both the new filter value and the old filter value obtained by invoking $f\_new$ and $f\_old$ on the target data value. The inlist expression may be a function that determines whether an expression matches another expression in a set of expressions.

In various first embodiments, if the original filter 213 can be transformed into an inlist expression, the query builder q may generate a new inlist expression by iterating over the values in the original inlist expression, which may include both the $f\_new$ and the $f\_old$ filter values for the original filter value when they are found to be different.

In various first embodiments, if the original filter can be transformed into a not-equals-to expression, the query builder q may generate a not-inlist expression that holds both the new filter value and old filter value obtained by invoking $f\_new$ and $f\_old$ on the target data value.

In various first embodiments, if the original filter can be transformed into a not-inlist expression, the query builder q may generate a new not-inlist expression by iterating over the values in the original not-inlist expression, which may include both the $f\_new$ and the $f\_old$ filter values for the original filter value when they are found to be different.

In various first embodiments, if the original filter 213 can be transformed into a like expression (e.g., for wildcard matching), the query builder q may generate expressions for the query 215 according to the second embodiments described below.

According to various second embodiments, the query builder q may generate the query 215 when the definition of the old and new canonicalization functions is such that $f\_new(x) != f\_old(x)$, where x is the filter value and $f\_new(a) != f\_old(b)$ where $a != b$, and where a and b are any one of the values that the custom indexed data can assume. In the second embodiments, the query builder q may join with the custom index table 230 and with base table 219 on the primary key/alternate key/row_id, and explicitly filter out spurious rows that may have been included because of overlap in function values, as discussed above. For each of the query expression types of the second embodiments, expressions for the new query 215 can be generated as follows.

The original filter 213 can be transformed into an equality expression. For example, the query builder q may generate a union-all* query comprising two components queries, one component representing the data associated with the old canonicalization format (e.g., $f\_old\_query$ 213o), and the other representing data associated with the new canonicalization format (e.g., $f\_new\_query$ 213$n$).

In such embodiments, each of the component queries joins the custom index table 230 with the base table 219, and may also include additional filters. For example, for each of the data value column(s) in the custom index table 230, one new replacement filter may be generated against the custom index table 230, and for each of the corresponding custom indexed columns in the base table 219, one new filter may be generated.

For component query $f\_old\_query$ 213$o$, the values for filters against the custom index table 230 may be calculated by invoking $f\_old$ on the corresponding original filter value 213 from the original query 214. Each of the filters generated against the base table 219 may include $f\_old$ invoked on the custom indexed column in the base table 219, with the value being the value returned by $f\_old$ when invoked on the corresponding value passed in the original query 214.

In various second embodiments, the query builder q may generate an inlist expression that holds both the new value and the old value obtained by invoking $f\_new$ and $f\_old$ on the target data value. In such embodiments, the inlist expression may be included in either a union query or a union-all query, since these query types by definition do not generate duplicate rows (the term "duplicate" may refer to a duplicate of the tuple that represents the primary key of the base table stored in the custom index table).

In various second embodiments, if the original filter 213 can be transformed into an inlist expression, the query builder q may generate union queries including each of the values in the in-list in a same or similar manner as discussed with regard to the first embodiments.

In various second embodiments, if the original filter 213 can be transformed into a not-equals-to expression, the query builder q may generate a not-inlist expression whose values are obtained by a union query for the specified value in a same or similar manner as discussed with regard to the first embodiments.

In various second embodiments, if the original filter 213 can be transformed into a not-inlist expression, the query builder q may generate a not-inlist expression whose values are obtained by a union query for each of the values in the inlist in a same or similar manner as discussed with regard to the first embodiments.

In various second embodiments, if the original filter 213 can be transformed into a like expression (for wildcard matching), the query builder q may generate a union-query in a same or similar manner as discussed with regard to the first embodiments, with the difference being that the filters against both the custom index table 230 and the base table 219 both would be like expressions.

In each of the second embodiments, the original filter expressions(s) 213 for which the corresponding replacement expression was generated, are replaced by the generated expressions in the query 215. In addition, for each of the above first and second embodiments, the new generated query 215 may be logically equivalent to the original query 214, but may be physically different from the original query 214 (e.g., in case of equality or in-list, the generated query may be a union-all query over each of the filter values). Logically equivalent queries may be queries that may produce the same result even with though they may have different conditions, filters, syntax, etc. Thus, logically equivalent queries may be reduced to or converted into the same query or function.

In embodiments, the query 215 may be a union query or union-all query. When the query 215 is a union query, the query 215 may return the combined results of $f\_old\_query$ 213$o$ and $f\_new\_query$ 213$n$ with duplicate records that are de-duplicated. When the query 215 is a union-all query, the query 215 may return the combined results of $f\_old\_query$ 213$o$ and $f\_new\_query$ 213$n$ without explicitly including a de-duplicating operation in the query 215. Each of the components 213$o$ and 213$n$ may be used to join with base table 219, and filter the original text values that are canonicalized per the canonicalization function $f$ associated with the corresponding query component (e.g., $f\_old(v)$ and $f\_new(v)$).

Once generated, the query optimizer 308 may provide the query 215 to the query executor 310 for execution. The query executor 310 may provide execution operations for the query 215 to the storage engine 312. The storage engine 312 may access main table 232 and/or index table 230 according to the execution operations. In embodiments, the execution operations may include identifying primary keys for one or more fields in the main table 232 based on the conditions and filter values in the second query; identifying, based on the indexes associated with the identified fields, individual records in the main table 232 that include the primary keys in the identified fields; and obtaining the individual records from the main table 232. In embodiments, identifying the primary keys may include obtaining index data (which may be custom index data) and/or primary key data from the index table 230 in response to issuing the second query against the index table 230.

In embodiments, the index table 230 may include automatically indexed data and/or custom index data. In such embodiments, the index table 230 may store index data along with information about the data types of the indexed data. The index data of index table 230 may be stored in a particular canonical data format, and the converter 302 may convert the indexes into a new canonical data format according to the various embodiments discussed herein. In addition, the converter 302 may interact with storage engine 312 to write any new entries that are written to a particular index or custom index using the new canonical data format.

The main table 232 may store various data for a particular organization (org) or tenant, and may be located in the tenant space 23 (see e.g., by FIG. 1B). According to various embodiments, for a table (e.g., main table 232), an additional set of one or more columns of data may be custom columns or custom fields, which allow a system administrator for an org to define additional fields that are not included in a pre-defined set of fields. In addition, the system administrator may flag or otherwise select one or more custom fields to be used as an indexing field. When a custom field is flagged or otherwise selected for indexing, the data in the selected column may be copied into an index field of the index table 230.

Referring back to FIG. 2, in response to the query 215, the database 22 may return a response 117 that includes data values from the main table 232 and/or indexes from index table 230 as specified by the query 215. The query engine 306 may generate query response 218 based on the response 117. The query response 218 may include a base table 219 or information to be used by the user system 12 to generate and display the base table 219. The base table 219 may include records or data values associated with indexes that are in the old canonical data format $f\_old$ and records or data values associated with indexes that are in the new canonical data format $f\_new$. The query response 218 may be provided to the user system 12 using a suitable message (e.g., an HTTP message and the like).

Once the user system 12 obtains the query response 218, the user system 12 may use the information contained in the query response 218 to generate and display the base table 219. In embodiments, the processor system 12A may extract the information from the query response 218, generate the base table 219 using the extracted information, and provide the base table 219 to the output system 12D for display.

Figure 3:
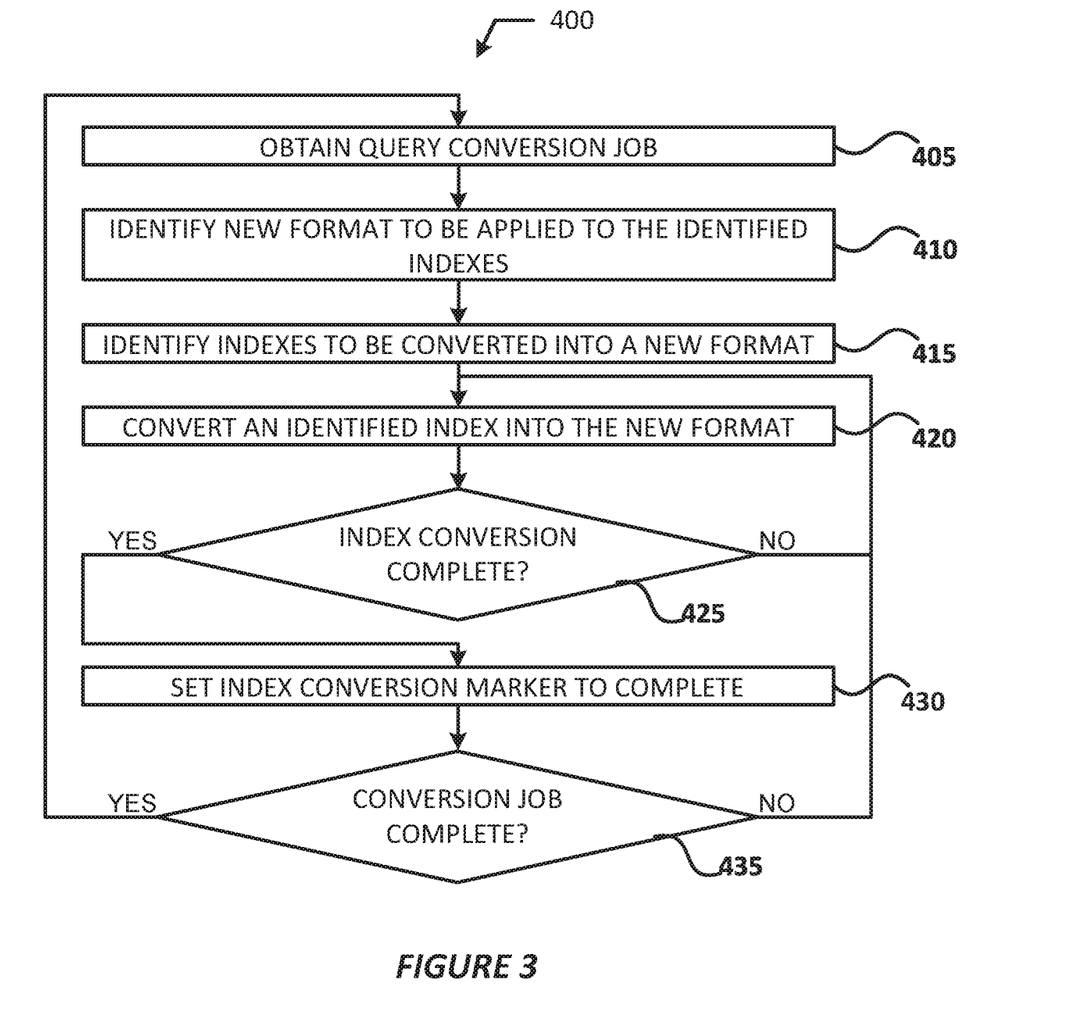
FIG. 3 illustrates a process for converting indexes from an old canonical data format to a new canonical data format in accordance with various embodiments.

FIG. 3 illustrates a process 400 for converting indexes from an old canonical data format to a new canonical data format, in accordance with various example embodiments. For illustrative purposes, the operations of process 400 are described as being performed by database system 16 discussed with regard to FIGS. 1A-B and 2. However, it should be noted that other computing devices may operate the process 400 in a multitude of implementations, arrangements, and/or environments. In embodiments, the database system 16 may include program code 26, which when executed by the processor system 17, causes the database system 16 to perform the various operations of process 400. While particular examples and orders of operations are illustrated in FIG. 3, in various embodiments, these operations may be re-ordered, separated into additional operations, combined, or omitted altogether.

Referring to FIG. 3, at operation 405, the processor system 17 may implement a converter function 302 to obtain a query conversion job. At operation 410, the processor system 17 may implement the converter function 302 to identify a new canonical data format to be applied to indexes. At operation 415, the processor system 17 may implement the converter function 302 to identify a set of indexes in an old canonical data format to be converted into the new canonical data format. At operation 420, the processor system 17 may implement the converter function 302 to convert an index of the set of indexes into the new canonical data format.

At operation 425, the processor system 17 may implement the converter function 302 to determine whether conversion of the identified index is complete. If at operation 425, the converter function 302 determines that conversion of the identified index has not finished, the converter function 302 may proceed back to operation 420 to complete the conversion of the identified index. If at operation 425, the converter function 302 determines that conversion of the identified index has finished, the converter function 302 may proceed to operation 430 to set an index conversion marker associated with the identified index as "complete" or "finished."

At operation 435, the processor system 17 may implement the converter function 302 to determine whether the query conversion job is complete. If at operation 435, the converter function 302 determines that the query conversion job is not complete, the converter function 302 may proceed back to operation 420 to select a next index of the set of identified indexes to convert into the new format. If at operation 435, the converter function 302 determines that the query conversion job is complete, the converter function 302 may proceed back to operation 405 to obtain a query conversion job, or the process 400 may end if there are no other conversion jobs to be completed.

Figure 4:
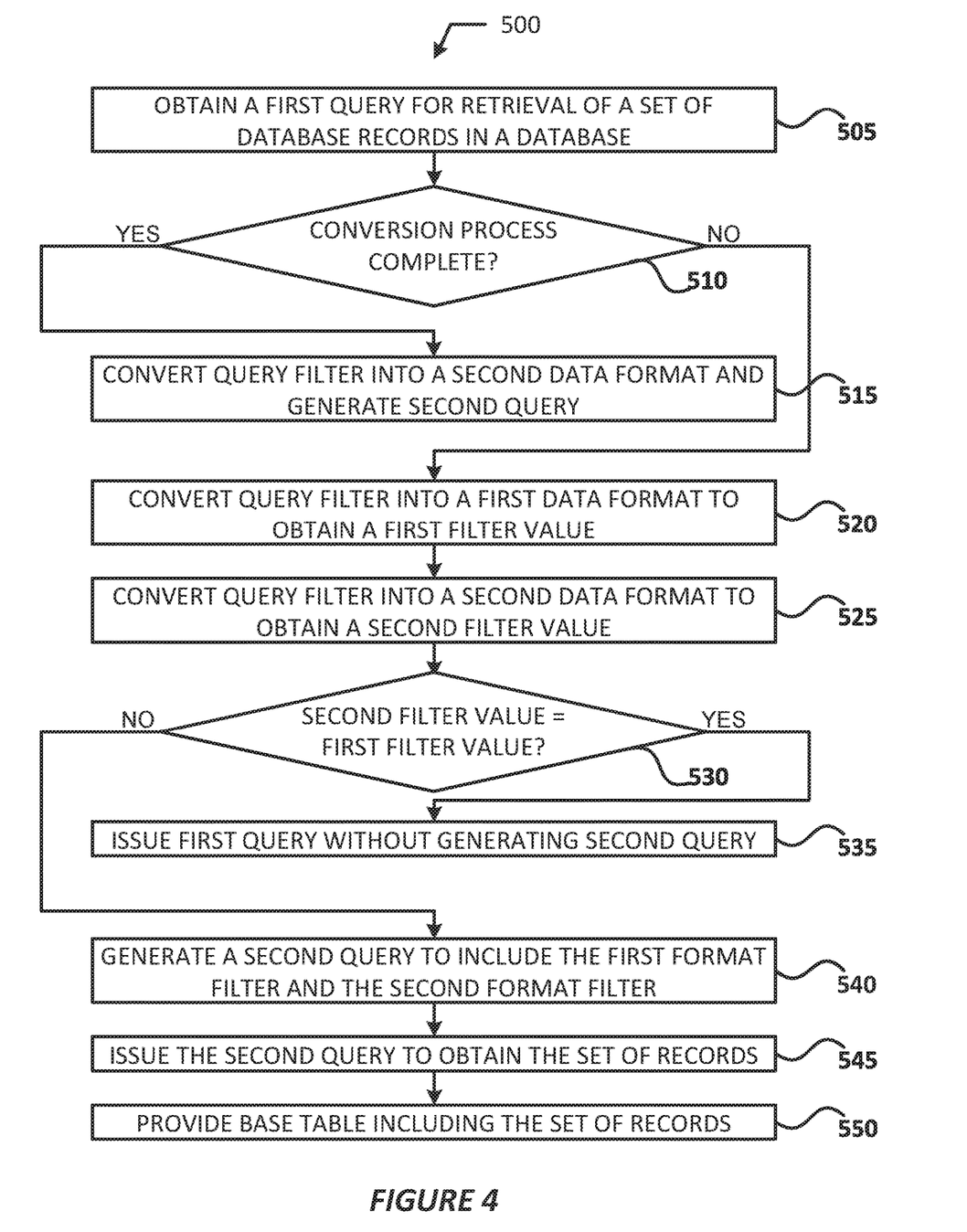
FIG. 4 illustrates a process for obtaining database records during an index conversion process in accordance with various embodiments.

FIG. 4 illustrates a process 500 for obtaining database records during an index conversion process, in accordance with various example embodiments. For illustrative purposes, the operations of process 500 are described as being performed by database system 16 discussed with regard to FIGS. 1A-B and 2. However, it should be noted that other computing devices may operate the process 500 in a multitude of implementations, arrangements, and/or environments. In embodiments, the database system 16 may include program code 26, which when executed by the processor system 17, causes the database system 16 to perform the various operations of process 500. While particular examples and orders of operations are illustrated in FIG. 4, in various embodiments, these operations may be re-ordered, separated into additional operations, combined, or omitted altogether.

Referring to FIG. 4, at operation 505, the processor system 17 may implement a query engine 304 to obtain a first query 214 for retrieval of a set of database records in a database. In embodiments, the first query 214 may comprise a filter 213 to be used for retrieval of the set of records.

At operation 510, the processor system 17 may implement the query engine 304 to determine whether an index conversion process is complete. If at operation 510, the query engine 304 determines that the index conversion process is complete, then the query engine 304 may proceed to operation 515 to convert the query filter 213 into a second data format and generate a second query 215 including the converted filter. In embodiments, the second data format may correspond to a new canonical data format to be applied to a set of indexes that are currently in a first data format. In embodiments, the first data format may be an old canonical data format.

If at operation 510, the query engine 304 determines that the index conversion process is not complete, then the query engine 304 may proceed to operation 520 to convert the query filter 213 into the first data format to obtain a first filter value. At operation 525, the processor system 17 may implement the query engine 304 to convert the query filter into the second data format to obtain a second filter value. In embodiments, the query engine 304 may implement a canonicalization function 306 to convert the query filter 213 into the first and/or second data format at operations 515-525. In embodiments, the query engine 304 may convert the query filter 213 into the first and/or second data formats according to the first and/or second embodiments discussed previously with regard to FIG. 2. As shown by FIG. 4, the query engine 304 may convert the query filter into the first data format prior to converting the filter into the second data format. However, in other embodiments, the query engine 304 may convert the query filter into the second data format prior to converting the filter into the first data format.

At operation 530, the query engine 304 may determine whether the second filter value is equal to the first filter value. If at operation 530, the query engine 304 determines that the second filter value is equal to the first filter value, then the query engine 304 may proceed to operation 535 to issue the first query 214 without generating the second query 215. In other embodiments, the query engine 304 may generate a second query 215 to only include the query filter in the first data format. If at operation 430, the query engine 304 determines that the second filter value is not equal to the first filter value, then the query engine 304 may proceed to operation 540 to generate a second query 215 to include both the query filter in the first data format (e.g., query component 213o) and the query filter in the second data format (e.g., query component 213n). In embodiments, the second query 215 generated at operation 540 may be a union-all query or a union query. In embodiments, the query engine 304 may implement a query optimizer 308 to generate the second query at operations 515, 535, and 540. In various embodiments, the query engine 304 may generate the second query 215 according to the first and/or second embodiments discussed previously with regard to FIG. 2.

At operation 545, the processor to implement a query executor 312 to issue the second query 215 to obtain individual records from the database 22. In embodiments, the query executor 312 may interact with a storage engine 312 to obtain the set of records from the database 22.

At operation 550, the processor system 17 may implement the query engine 304 to provide a base table 219 including the set of records to a user system 12. In embodiments, when the second query 215 includes both the query filter in the first data format and the query filter in the second data format, the base table 219 may include records associated with indexes in the first data format and records associated with indexes in the second data format. In embodiments where the second query is a union query, the query engine 304 may identify and delete/discard duplicate records (e.g., a record associated with an index in the first data format that is a duplicate of a record associated with an index in the second data format) from among the obtained records. In such embodiments, when a duplicate record is found, the query engine 304 may delete either the record associated with indexes in the first data format or the record associated with indexes in the second data format. In embodiments where the second query 215 is a union-all query, the query engine 304 may provide all of the obtained records in the base table 219 regardless of whether any of the records are duplicates.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. A computer program embodied in one or more non-transitory computer-readable media and to be implemented by a database system, the computer program comprising a set of instructions operable to:

during execution of a conversion operation that includes converting indexes having a first data format into a second data format,
obtain a first query for retrieval of a set of records in a database, wherein the first query comprises a filter in an original data format to be used for retrieval of the set of records;
convert the filter into the first data format to obtain a first filter value using a corresponding first data format conversion function;
convert the filter into the second data format to obtain a second filter value using a corresponding second data format conversion function;
generate a second query to include the filter in the first data format and the filter in the second data format when the first filter value is different than the second filter value; and
issue the second query to obtain the set of records in the database, and
when the second query is a union query, the set of instructions is operable to:
identify duplicate records from among obtained individual records, and
generate a base table including the set of records and excluding individual records that are duplicates of other individual records, and individual records of the set of records are associated with indexes in the first data format or associated with indexes in the second data format.

2. The computer program of claim 1, wherein the set of instructions is operable to:

generate the second query when the filter in the second data format is equal to another filter in the first data format and the filter in the original data format is not equal to the other filter in the original data format; and
issue the first query without generating the second query when the first filter value is equal to the second filter value.

3. The computer program of claim 1, wherein, to issue the second query, the set of instructions is operable to:

identify, based on the second query, primary keys for a field in the database;
identify, based on the indexes associated with the identified field, individual records in the database that include the primary keys in the identified field; and
obtain the individual records from the database to be the set of records.

4. The computer program of claim 3, wherein when the second query is a union-all query, the set of instructions is operable to:

generate a base table including the set of records, wherein individual records of the set of records are associated with indexes in the first data format or associated with indexes in the second data format.

5. The computer program of claim 1, wherein the indexes are custom indexes, and wherein the first data format is an old canonical data format and the second data format is a new canonical data format different than the old canonical data format.

6. The computer program of claim 5, wherein the conversion operation is to convert each of the custom indexes from the old canonical data format to the new canonical data format, and wherein the set of instructions is operable to:
generate the second query during the conversion operation; and
generate a third query to only include the second data format filter after completion of the conversion operation.

7. A database system comprising:
a processor system, the processor system configurable to implement a converter function to:
identify a new canonical data format to be applied to indexes,
identify a set of indexes in an old canonical data format to be converted into the new canonical data format, and
convert each index of the set of indexes into the new canonical data format using a new data format conversion function;
the processor system configurable to implement a canonicalization function to:
while the converter function converts each index into the new canonical data format,
convert, using an old data format conversion function, a filter included with a first query into the old canonical data format to obtain a first filter value, and
convert, using the new data format conversion function, the filter into the new canonical data format to obtain a second filter value;
the processor system configurable to implement a query optimizer to generate a second query to include the old canonical data format filter and the new canonical data format filter when the first filter value is different than the second filter value; and
the processor configurable to implement a query executor to execute the second query to obtain individual records from a database, and when the second query is a union query, the query executor is to:
identify duplicate records from among the obtained individual records, and
generate a base table including the set of records and excluding individual records that are duplicates of other individual records, and individual records of the set of records are associated with indexes in the old canonical data format or associated with indexes in the new canonical data format.

8. The database system of claim 7, further comprising:
a network interface coupled with the processor system, wherein the network interface is configurable to obtain the first query from a user system, wherein the first query is for retrieval of a set of records in the database; and send the second query to one or more data storage systems for storage or retrieval of data for execution of the second query.

9. The database system of claim 7, wherein the processor system is configurable to implement the query optimizer to:

issue the first query when the first filter value is equal to the second filter value.

10. The database system of claim 7, wherein the processor system is configurable to implement the query optimizer to:
identify, based on the second query, primary keys for a field in the database;
identify the individual records in the database that include the primary keys in the identified field based on the indexes associated with the identified field.

11. The database system of claim 9, wherein the second query is a union query or a union-all query when the first filter value is different than the second filter value.

12. The database system of claim 7, wherein the processor system is configurable to implement the query optimizer to:
generate the second query while the converter function converts each index of the set of indexes into the new canonical data format; and
generate a third query based on the first query after the converter function converts each index of the set of indexes into the new canonical data format, wherein the third query only includes the new canonical data format filter.

13. The database system of claim 7, wherein the set of indexes are custom indexes, wherein the custom indexes comprise data values located in a selected field of the database.

14. A computer program embodied in one or more non-transitory computer-readable media and to be implemented by a database system, the computer program comprising a set of instructions operable to:
identify custom indexes having an old canonical data format to be converted into a new canonical data format;
obtain a user-issued query for retrieval of a set of records in a database, wherein the user-issued query comprises an original filter to be used for retrieval of the set of records; and
during conversion of the indexes having the old canonical format into the new canonical format,
convert, using an old data format conversion function, the original filter into the old canonical data format to obtain a first filter value;
convert, using a new data format conversion function, the original filter into the new canonical data format to obtain a second filter value;
generate an index data state query to include the old canonical data format filter and the new canonical data format filter when the first filter value is different than the second filter value; and
issue the index data state query to obtain the set of records in the database;
provide, to a user system that issued the user-issued query, a base table including the obtained set of records, wherein individual records of the set of records are associated with indexes in the old canonical data format or associated with indexes in the new canonical data format; and
when the index data state query is a union query,
identify duplicate records from among the obtained set of records, and
generate the base table to include the set of records excluding individual records that are duplicates of other individual records.

15. The computer program of claim 14, wherein the index data state query is a query that does not require explicit de-duplication rows when (i) the first filter value does not equal the second filter value, and (ii) a first custom index data value converted into the new canonical data format does not equal a second custom index data value converted into the old canonical data format, wherein the first custom index data value does not equal the second custom index data value.

16. The computer program of claim 15, wherein, to generate the index data state query, the set of instructions is operable to:

generate an inlist expression when the original filter is capable of being transformed into an equality expression, wherein the inlist expression comprises the first filter value and the second filter value.

17. The computer program of claim 15, wherein, to generate the index data state query, the set of instructions is operable to:

generate a first inlist expression through iteration over values in a second inlist expression when the original filter is capable of being transformed into an inlist expression, wherein the first inlist expression comprises the first filter value and the second filter value when the first filter value is different than the second filter value.

18. The computer program of claim 15, wherein, to generate the index data state query, the set of instructions is operable to:

generate a not-inlist expression when the original filter is capable of being transformed into a not-equals-to expression, wherein the not-inlist expression comprises the first filter value and the second filter value when the first filter value is different than the second filter value.

19. The computer program of claim 15, wherein, to generate the index data state query, the set of instructions is operable to:

generate a first not-inlist expression through iteration over values in a second not-inlist expression when the original filter is capable of being transformed into a not-inlist expression, wherein the first not-inlist expression comprises the first filter value and the second filter value when the first filter value is different than the second filter value.

* * * * *